US009531624B2

(12) United States Patent
Modi et al.

(10) Patent No.: US 9,531,624 B2
(45) Date of Patent: Dec. 27, 2016

(54) METHOD AND APPARATUS FOR PATH SELECTION

(71) Applicant: Riverbed Technology, Inc., San Francisco, CA (US)

(72) Inventors: Sudeep Modi, San Francisco, CA (US); Joyu Wu, San Francisco, CA (US); Anoop Gupta, San Francisco, CA (US); Devanath Srinivasa, San Francisco, CA (US); Gabriel Levy, San Francisco, CA (US); Luca Niccolini, San Francisco, CA (US); Sarath Kumar Sankaran Kutty, San Francisco, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 114 days.

(21) Appl. No.: 14/450,033

(22) Filed: Aug. 1, 2014

(65) Prior Publication Data

US 2015/0036684 A1 Feb. 5, 2015

Related U.S. Application Data

(60) Provisional application No. 61/862,388, filed on Aug. 5, 2013.

(51) Int. Cl.
*H04L 12/26* (2006.01)
*H04L 12/707* (2013.01)
*H04L 12/947* (2013.01)
*H04L 12/721* (2013.01)
*H04L 12/703* (2013.01)

(52) U.S. Cl.
CPC .............. *H04L 45/22* (2013.01); *H04L 49/252* (2013.01); *H04L 45/26* (2013.01); *H04L 45/28* (2013.01); *H04L 45/66* (2013.01)

(58) Field of Classification Search
USPC ......................... 370/235–400; 709/203–242
See application file for complete search history.

(56) References Cited

U.S. PATENT DOCUMENTS

| 6,058,429 A * | 5/2000 | Ames .................... H04L 49/602 370/399 |
| 7,222,188 B1 * | 5/2007 | Ames .................... H04L 49/602 370/392 |
| 8,135,850 B2 * | 3/2012 | Narayana ............ H04L 65/1083 370/338 |
| 8,516,158 B1 * | 8/2013 | Wu ........................ H04L 69/04 709/223 |

(Continued)

*Primary Examiner* — Man Phan
(74) *Attorney, Agent, or Firm* — Park, Vaughan, Fleming & Dowler LLP; Laxman Sahasrabuddhe

(57) ABSTRACT

Systems and techniques are described for path selection. A packet can be transparently intercepted at an intermediary device. Next, the intermediary device may modify one or more bits in the header of the packet. The intermediary device can then forward the packet to the next hop device. In some network configurations, the modifications to the one or more bits in the header of the packet may cause a downstream device to select a path that is different from the path that would have been selected by the downstream device if the one or more bits in the header of the packet had not been modified. A path selection policy can be used to determine whether or not one or more bits in the header of the packet are to be modified.

3 Claims, 7 Drawing Sheets

(56) References Cited

U.S. PATENT DOCUMENTS

| | | | |
|---|---|---|---|
| 8,739,244 B1* | 5/2014 | Wu | H04L 67/2847 |
| | | | 709/220 |
| 8,755,383 B2* | 6/2014 | Keesara | H04L 45/66 |
| | | | 370/389 |
| 8,965,955 B2* | 2/2015 | Agarwal | H04L 69/16 |
| | | | 709/203 |
| 9,009,322 B1* | 4/2015 | Molleti | H04L 45/125 |
| | | | 709/224 |
| 9,065,866 B2* | 6/2015 | Agarwal | H04L 67/2814 |
| 9,191,201 B1* | 11/2015 | Thangavelu | H04L 9/0822 |
| 2013/0283041 A1* | 10/2013 | Vajirkar | H04L 61/1511 |
| | | | 713/156 |

* cited by examiner

METHOD AND APPARATUS FOR PATH SELECTION

RELATED APPLICATION

This application claims benefit of U.S. Provisional Application Ser. No. 61/862,388, filed on 5 Aug. 2013, entitled "Path Selection," by the same inventors, the contents of which are herein incorporated by reference in their entirety.

BACKGROUND

Technical Field

This disclosure relates to computer networking. More specifically, this disclosure relates to methods and apparatuses for path selection.

Related Art

Enterprise networks can include one or more wide-area networks (WANs) that interconnect offices that can be distributed over a large geographical area. Some enterprise networks use WAN optimization devices to improve network performance. WAN optimization devices optimize network traffic to improve WAN performance in reading and/or writing data over a network. Some WAN optimization devices monitor users' network traffic to attempt to predict data likely to be requested by users. This predicted data is prefetched over the WAN and cached by the WAN optimization devices at the users' respective network locations, so that this data can be quickly accessed by users if requested. WAN optimization devices also typically compress data (e.g., by performing de-duplication) to improve WAN performance. The WAN optimization devices' prefetching, caching, and compression helps mask the bandwidth and latency limitations of WANs from users.

WAN optimization devices may operate singly or in pairs at each side of a WAN connection to optimize network traffic. WAN optimization devices are referred to in the art by many different terms, including, but not limited to, transaction accelerators, WAN optimizers, WAN optimization controllers (WOCs), wide-area data services (WDS) appliances, WAN traffic optimizers (WTOs), and protocol accelerators or optimizers.

Techniques for optimizing network traffic to improve network performance in reading and/or writing data over a network are referred to in the art by many different terms, including, but not limited to, WAN acceleration, transaction acceleration, transaction pipelining, protocol pipelining, request prediction, application flow acceleration, and protocol acceleration. In this disclosure, the term "WAN optimization device" is used to refer to such devices and applications and "WAN optimization" is used to refer to such techniques.

In the hunt for increased performance at lower cost, many information technology (IT) organizations are creating so-called hybrid networks that, like many of today's applications, escape the boundaries of traditional enterprise network infrastructure. In some use cases, the primary multi-protocol label-switching (MPLS) network might connect data center branches and ferry mission-critical work with higher priority, while cheaper virtual private network (VPN) and local Internet lines carry the remainder of traffic. The hybrid network is defined by its mixed use of multiple topologies. While hybrid networks solve important problems, conventional systems and techniques do not enable IT and business to drive and support new applications in the network and establish service level agreements (SLAs) for each application with enough resources at every point of its lifecycle.

Specifically, in conventional approaches, lower-priority branch Internet traffic is typically backhauled along with mission-critical traffic across expensive private networks to the data center, then the low-priority branch Internet traffic exited from the data center to the Internet (typically through a firewall at the data center), and the return traffic would likewise take the circuitous route back to the end user. In such conventional approaches, backup links are often underutilized, and it is not possible to selective route web and cloud services to the Internet directly from the branch location.

SUMMARY

Some embodiments described herein provide systems and techniques for path selection. Path selection allows an application to be mapped to a desired path across a hybrid network. In particular, with path selection, specific applications can be mapped to specific WAN paths, and Internet traffic can be broken out right at branch locations, thereby avoiding the branch's cloud and web application traffic from having to backhaul through the data center's expensive connections (e.g., costly MPLS pipes) and back again. Additionally, if a mission-critical application requires high network performance, path selection allows a network administrator to assign a mission-critical application to the primary high-availability connection (e.g., an MPLS pipe) where network performance (e.g., latency, bandwidth, etc.) can be guaranteed. As yet another example, let's assume that a mid-importance application is mapped to the VPN, but the VPN fails. Path selection enables the network to be configured so that the network can quickly fail over to a backup communication channel (e.g., an MPLS pipe). Furthermore, path selection can enable a network administrator to send low-priority traffic (e.g., YouTube traffic) out to the lowest-cost, lowest-priority Internet link, and send the higher-priority traffic (e.g., traffic generated by a financial application) over a high-bandwidth and high-performance connection (e.g., an MPLS pipe).

In some embodiments, an intermediary device (e.g., a WAN optimization device) can be located between a source device (e.g., a router) and a first destination device (e.g., a next hop router). The intermediary device can transparently intercept a packet that is sent from the source device to the first destination device. Specifically, a header of the packet can include a link layer source address associated with the source device and a first link layer destination address associated with the first destination device. Next, in response to determining that the packet is to be forwarded to a second destination device (e.g., another next hop router) instead of the first destination device, the intermediary device can replace the first link layer destination address with a second link layer destination address associated with the second destination device, and forward (or switch or route) the packet to the second destination device.

In some embodiments, determining that the packet is to be forwarded to the second destination device instead of the first destination device includes determining that a path that passes through the first destination device has a fault. Specifically, probe packets can be periodically sent through multiple paths, and a path can be flagged as having a fault if a response to a probe packet includes an error message or if no response is received to the probe packet within a predetermined time period.

In some embodiments, determining that the packet is to be forwarded to the second destination device instead of the first destination device includes determining a network flow associated with the packet, and determining that the second destination is associated with the network flow based on a path selection table. Specifically, the path selection table can be created based on a path selection policy that associates at least two different applications with two different paths in the network. For example, the packet can be analyzed to determine a fingerprint associated with the packet. Next, an application associated with the fingerprint can be identified (e.g., by looking up a database that associates known fingerprints with applications). A path associated with the application can then be selected based on the path selection policy. Next, a network flow associated with the packet can be determined, and an association between the network flow and the selected path can be stored in the path selection table.

In some embodiments, a routing table on a downstream device forwards the packet along a first path based at least on a network layer destination address in a network layer header of the packet. In response to determining that the packet is to be forwarded along a second path that is different from the first path, the intermediary device can modify one or more bits in the network layer header of the packet, and forward the packet (with the modified network layer header bits) to the downstream device, thereby causing the downstream device to forward the packet along the second path instead of the first path. In some embodiments, the intermediary device can modify differentiated services (DS) bits in the Internet Protocol (IP) header, and the downstream device can be configured to route the packet based on the DS bits. In some embodiments, determining that the packet is to be forwarded along the second path instead of the first path includes determining that the first path has a fault. Specifically, probe packets can be periodically sent through the first path and the second path, and the first path and/or the second path can be flagged as having a fault if a response to a probe packet includes an error message or if no response is received to the probe packet within a predetermined time period.

In some embodiments, determining that the packet is to be forwarded along a second path instead of along the first path includes determining a network flow associated with the packet, and determining that the second path is associated with the network flow based on a path selection table. Specifically, the path selection table can be created based on a path selection policy that associates at least two different applications with two different paths in the network. For example, the packet can be analyzed to determine a fingerprint associated with the packet. Next, an application associated with the fingerprint can be identified (e.g., by looking up a database that associates known fingerprints with applications). A path associated with the application can then be selected based on the path selection policy. Next, a network flow associated with the packet can be determined, and an association between the network flow and the selected path can be stored in the path selection table.

DETAILED DESCRIPTION

Figure 1A:
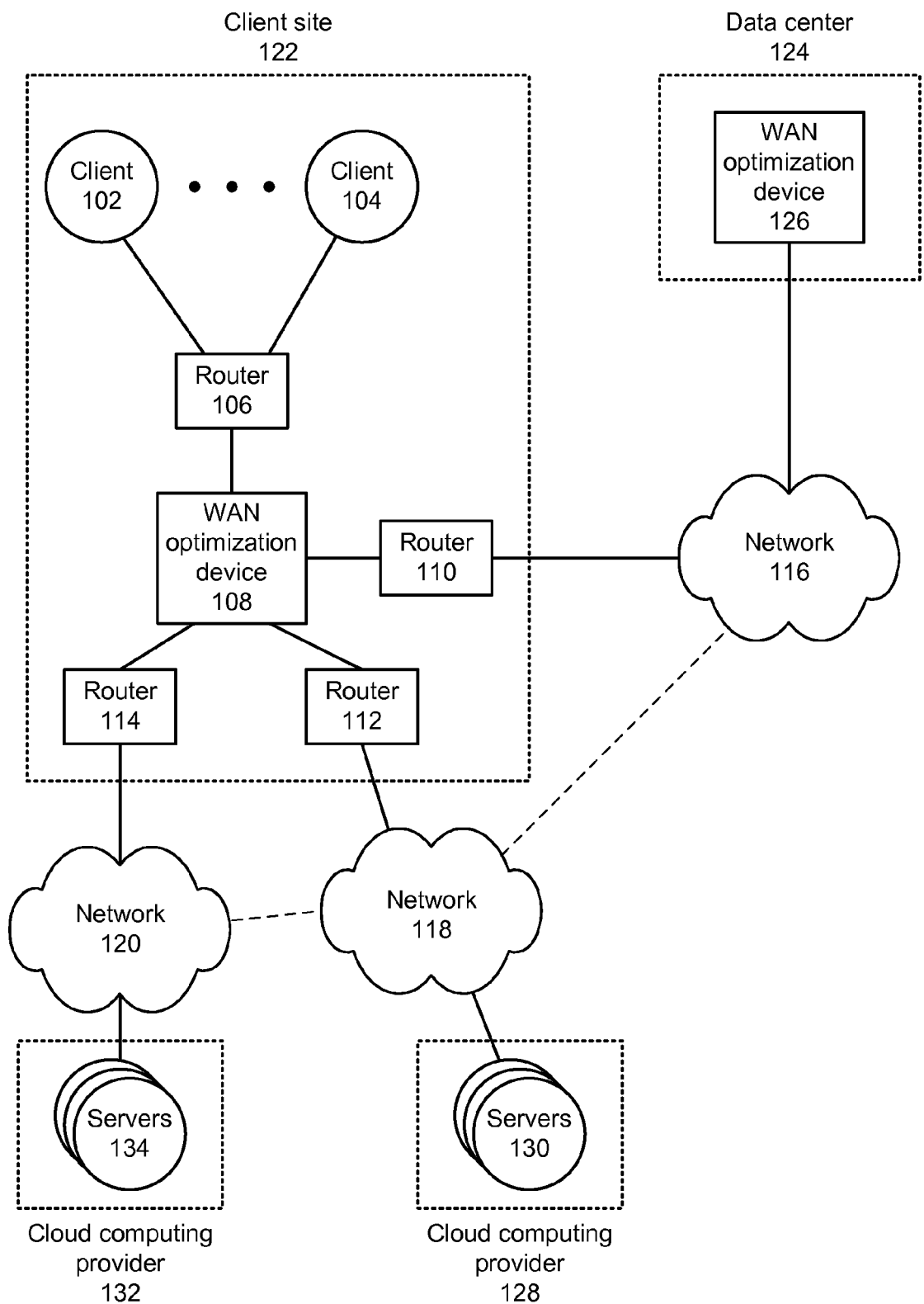
FIG. 1A illustrates an example of a network in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following embodiments: (1) only X; (2) only Y; (3) only Z; (4) X and Y; (5) X and Z; (6) Y and Z; and (7) X, Y, and Z.

According to one definition, a computer is any device that is capable of performing computations. In some embodiments, a computer can include a processing mechanism that is capable of executing instructions stored on a storage medium. Examples of computers include, but are not limited to, smartphones, handheld computers, laptop computers, desktop computers, distributed computers, printers, appliances, etc.

According to one definition, a network is a set of one or more interconnected devices that is capable of delivering information from one computer to another computer. Examples of networks include, but are not limited to, wireless and wired networks, local area networks (LANs), metropolitan area networks (MANs), WANs, private networks, public networks, intranets, internets, etc.

Communication between two nodes of a network is typically accomplished using a layered software architecture, which is often referred to as a networking software stack or simply a networking stack. As is true of any data processing function, a given functionality in a networking stack can be implemented using hardware or software or a combination thereof. The decision to implement a specific functionality in hardware or software is typically based on a tradeoff between performance and cost.

Each layer is usually associated with one or more protocols which define the rules and conventions for processing packets in that layer. Each lower layer performs a service for the layer immediately above it to help with processing packets, and each layer typically adds a header (control data) that allows peer layers to communicate with one another. At the sender, this process of adding layer specific headers is usually performed at each layer as the payload moves from higher layers to lower layers. The receiving host generally performs the reverse of this process by processing headers of each layer as the payload moves from the lowest layer to the highest layer.

A data link layer (or link layer for short) can be defined as a layer that manages a communication channel between adjacent communication devices. For example, if two routers are connected to each other via a cable, then the link layer would typically manage the communication channel between these two routers. The Ethernet layer is an example of a link layer. A network layer can be defined as a layer that enables communication between any two devices across the network. For example, the Internet Protocol (IP) layer is an example of a network layer that enables communication between two routers in an IP network.

FIG. 1A illustrates an example of a network in accordance with some embodiments described herein. Although some of the examples described in this disclosure are in the context of a WAN, the disclosed systems and techniques can generally be used to improve performance of any type of network.

Client site 122 can be a company's headquarters or a company's regional office, and can include one or more clients 102-104, routers 106, 110, 112, and 114, and WAN optimization device 108 that are connected to each other as shown in FIG. 1A. Data center 124 can host servers and data storage systems (not shown in FIG. 1A) for the company's enterprise network, and include WAN optimization device 126. Data center 124 may be reachable via network 116.

WAN optimization device 108 can establish a connection with WAN optimization device 126, and can use the connection to optimize at least some communications between clients in client site 122 and servers in data center 124. For example, WAN optimization devices 108 and 126 can intercept a connection between a client at client site 122 and a server at data center 124 and establish the following two local connections: a first local connection between the client and WAN optimization device 108, and a second local connection between the server and WAN optimization device 126. The interception may be performed transparently, i.e., the client and server may communicate with each other as if they had established an end-to-end connection without realizing that, in fact, the end-to-end connection was split into multiple connections by WAN optimization devices 108 and 126.

WAN optimization devices 108 and 126 can then use the three connections—the connection between the two WAN optimization devices and the two local connections—to optimize communications between clients in client site 122 and servers in data center 124. For example, data sent by a client to a server can be received at WAN optimization device 108. Next, WAN optimization device 108 can transform the data (e.g., by performing de-duplication) and send the transformed data to WAN optimization device 126. The transformation can significantly reduce the size of the data, thereby reducing the amount of bandwidth required to communicate the data over network 116. WAN optimization device 126 can then perform an inverse transformation to recover the original data. The recovered original data can then be sent from WAN optimization device 126 to a server in data center 124. Likewise, in the return path (i.e., when a server sends data back to a client), the data can be transformed by WAN optimization device 126 and the original data can be subsequently recovered by WAN optimization device 108.

In addition to reducing the amount of bandwidth required for communicating data over network 116, WAN optimization devices 108 and 126 can also reduce latency by, for example, performing intelligent prefetching. Specifically, WAN optimization device 108 can intelligently prefetch data from a server in data center 126 and provide the data to a client when a request for the data from the client is intercepted. Performing intelligent prefetching can significantly reduce latency because the round trip time from the client to WAN optimization device 108 can be significantly smaller than the round trip time from the client to data center 124.

In a conventional network configuration, all traffic from client site 122 is first routed to data center 124 via network 116, and any traffic that needs to outside the enterprise network then exits the enterprise network at data center 124, e.g., via a firewall. In such network configurations the traffic load on network 116 can become very high if clients in client site 122 access cloud computing services that are hosted outside the enterprise network.

Therefore, to reduce network operations costs, the network configuration shown in FIG. 1A may be used in which cloud computing provider 132 is reachable via network 120 that is connected to router 114 at client site 122, and cloud computing provider 128 is reachable via network 118 that is connected to router 112 at client site 122. Cloud computing providers 128 and 132 may provide cloud computing services on servers 130 and 134, respectively. In such network configurations, the traffic between clients 102-104 and cloud computing providers 128 and 132 needs to be routed differently from the traffic between clients 102-104 and servers in data center 124.

Figure 1B:
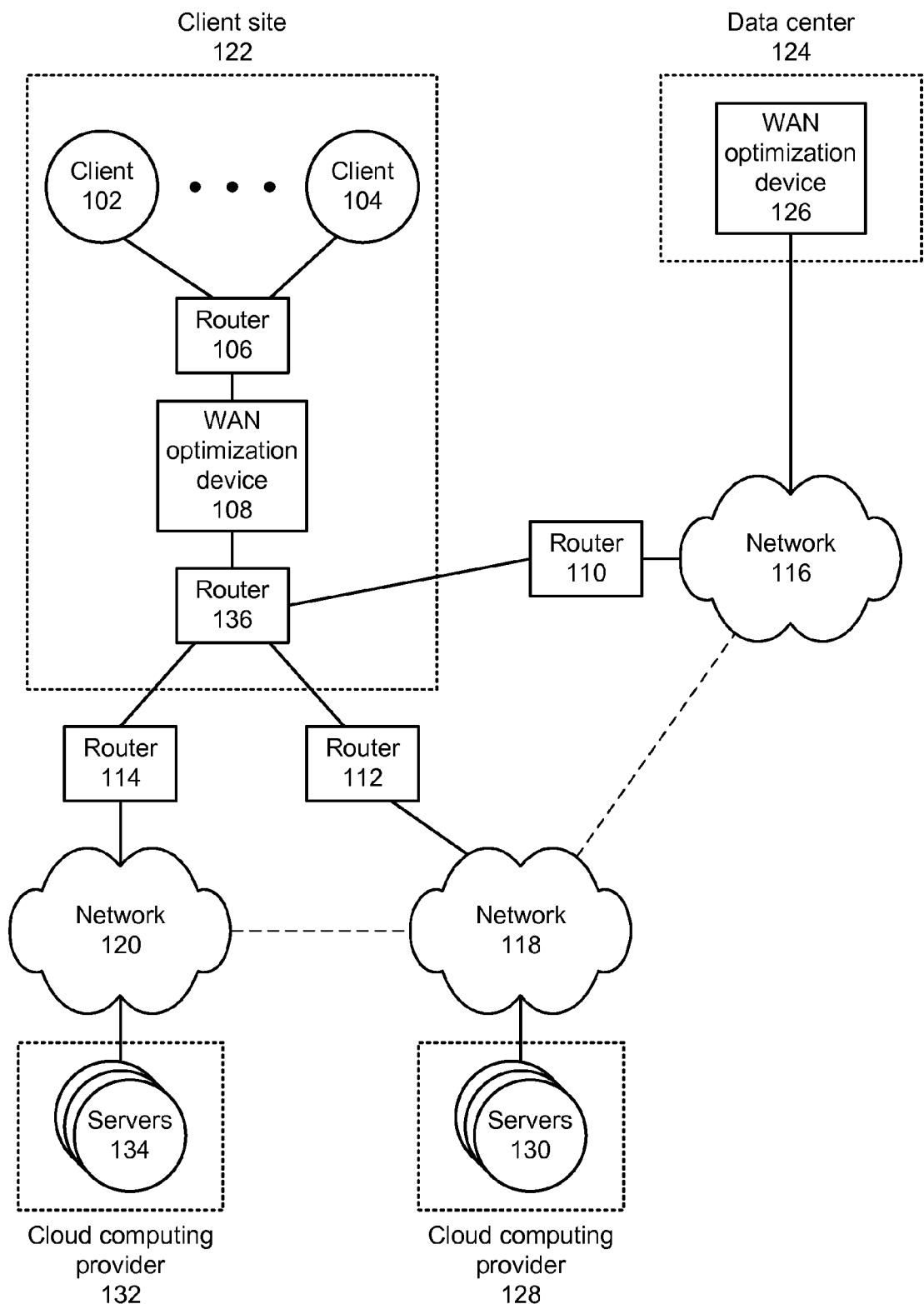
FIG. 1B illustrates an example of a network in accordance with some embodiments described herein.

Many other network configurations will be apparent to a person having ordinary skill in the art. For example, FIG. 1B illustrates another example of a network in accordance with some embodiments described herein. The difference between FIG. 1A and FIG. 1B is that, in FIG. 1B, router 136 is connected to WAN optimization device 108, and router 136 is then connected to routers 110, 112, and 114. In some embodiments, other network paths (shown using dashed lines in FIGS. 1A and 1B) may also exist between networks 116, 118, and 120. In some embodiments, networks 116, 118, and 120 may be sub-networks of a larger network, while in other embodiments, networks 118 and 120 may be the same network. Furthermore, the number and types of devices shown in FIGS. 1A-1B are for illustration purposes only and are not intended to limit the scope of this disclosure.

Some embodiments described in this disclosure provide systems and techniques for transparently intercepting network flows, identifying an application that is associated with the network flow using deep packet inspection, and then forwarding the traffic of different network flows (and therefore of different applications) over different paths based on a path selection policy. For example, some embodiments described in this disclosure can route traffic that is destined to a cloud computing provider 132 via router 114 instead of the traffic first being routed to data center 124 and then being routed to cloud computing provider 132. Some systems and techniques for path selection are now described.

Path Selection

Figure 2A:
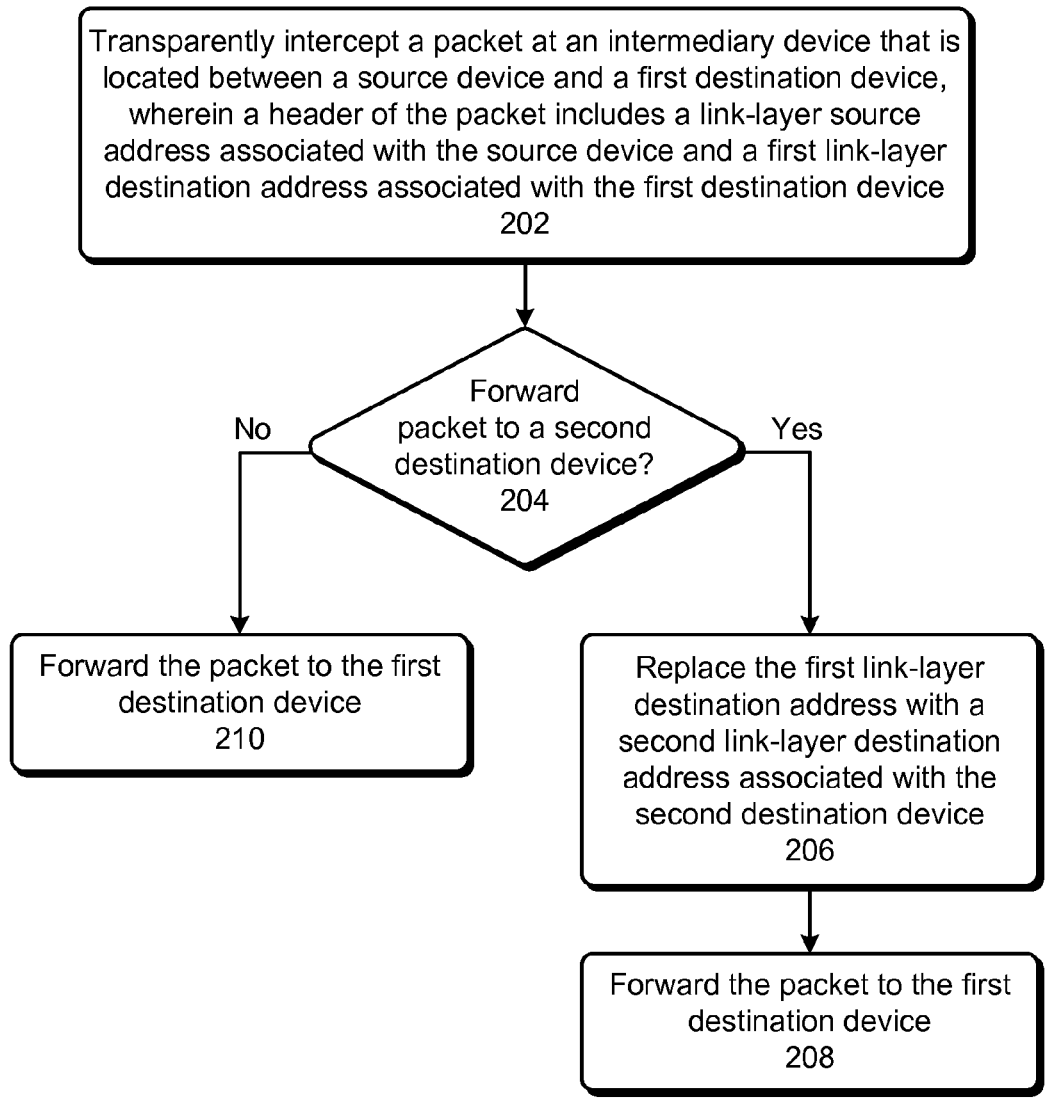
FIG. 2A illustrates a process for path selection in accordance with some embodiments described herein.

FIG. 2A illustrates a process for path selection in accordance with some embodiments described herein. The process can begin by transparently intercepting a packet at an intermediary device that is located between a source device and a first destination device, wherein a header of the packet includes a link layer source address associated with the source device and a first link layer destination address associated with the first destination device (operation 202). For example, in FIG. 1A, WAN optimization device 108 can be the intermediary device that is located between a source device, i.e., router 106, and a destination device, i.e., router 110. Next, the process can determine if the packet is to be forwarded to a second destination device (operation 204). If so, the first link layer destination address can be replaced with a second link layer destination address associated with the second destination device (operation 206), and the packet can be forwarded to the first destination device (operation 208). Otherwise, the packet can be forwarded to the first destination device (operation 210).

Figure 2B:
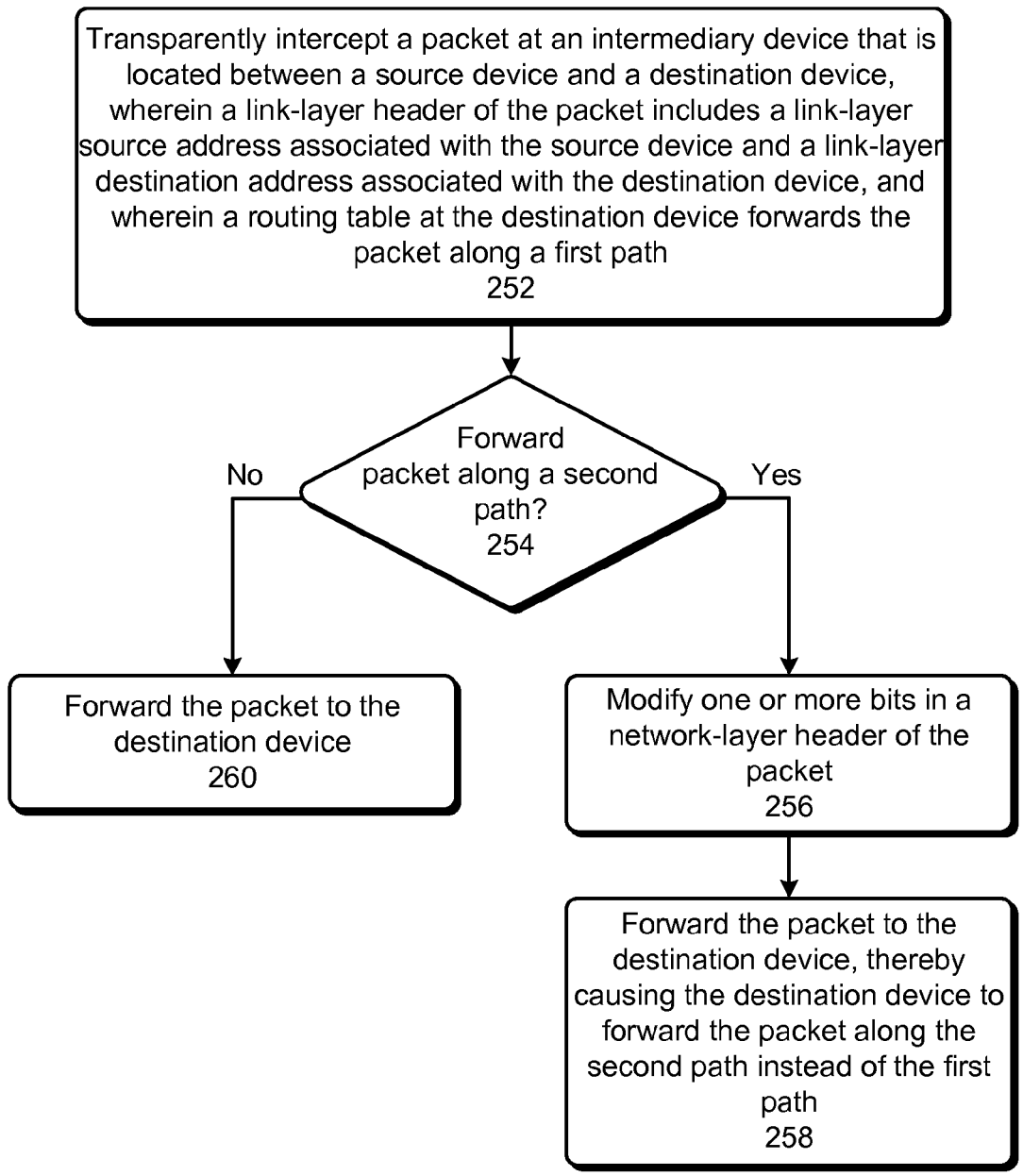
FIG. 2B illustrates a process for path selection in accordance with some embodiments described herein.

FIG. 2B illustrates a process for path selection in accordance with some embodiments described herein. The process can begin by transparently intercepting a packet at an intermediary device that is located between a source device and a destination device, wherein a link layer header of the packet includes a link layer source address associated with the source device and a link layer destination address associated with the destination device, and wherein a routing table at the destination device forwards the packet along a first path (operation 252). For example, in FIG. 1B, WAN optimization device 108 can be the intermediary device that is located between a source device, i.e., router 106, and a destination device, i.e., router 136. Next, the process can determine if the packet is to be forwarded along a second path (operation 254). If so, one or more bits in a network layer header of the packet can be modified (operation 256), and the packet can be forwarded to the destination device, thereby causing the destination device to forward the packet along the second path instead of the first path (operation 258). Otherwise, the packet can be forwarded to the destination device (operation 260).

Path selection can be used in many scenarios. For example, path selection can be used to route traffic associated with different applications along different paths. In some embodiments, path selection can be used to quickly switch to a backup path if a fault is detected in a primary path. Specifically, a WAN optimization device can periodically send probe messages along multiple paths, and if a fault is detected in a path that is currently being used to route traffic for a network flow, then the network flow can be switched over to a different path that does not have a fault.

In some embodiments, the WAN optimization device (or another device in the network) can analyze packets to determine a path over which the packets are to be routed. For example, the payload of the packet can be analyzed to identify an application (e.g., an email application or a cloud document editing application) that is associated with the packet. Next, the WAN optimization device can use a policy to determine how to route packets that are associated with the identified application (e.g., the policy may specify that the traffic associated with application A1 is to be routed through router R1, and all other traffic is to be routed through the default router R2). The WAN optimization device can then determine a network flow associated with the packet. In some embodiments a network flow may be defined using one or more of the following fields: source IP address (or more generally, a network layer source address), source port number (or more generally, a transport layer source identifier), destination IP address (or more generally, a network layer destination address), and destination port number (or more generally, a transport layer destination identifier). This example of a network flow has been provided for illustration purposes only and is not intended to limit the scope of the embodiments to the forms disclosed.

Next, the WAN optimization device can store an association between the network flow and the path (or route) that was determined based on the policy. Subsequently, all packets for the network flow can be routed along the path that was determined based on the policy. (Note that determining the network flow of a packet usually requires considerably less computation than analyzing the payload of a packet to identify an application associated with the packet.)

The path selection policy can be specified by a user. For example, the user can specify that packets (and therefore the network flow that is associated with the packets) that have a particular signature are to be routed to a particular IP address (or a domain name). The WAN optimization device can use this information to determine the next hop router through which the packet is to be routed, and modify packet header information (if required) to ensure that the packet is routed in accordance with the policy.

In some embodiments, the device that performs deep packet inspection (i.e., the device that analyzes the payload of a packet to determine the application associated with the packet) and associates a network flow with a particular path based on a user-specified policy can be different from the device that modifies the packet header information to effectuate path selection. For example, in FIG. 1A, suppose WAN optimization device is merely a path selection device that is capable of modifying packet header information to effectuate path selection, but is not capable of performing deep packet inspection. In this case, another device (not shown in FIG. 1A) may perform deep packet inspection and apply the user-defined policy, and provide the results, e.g., a mapping of network flows to next-hop routers, to the path selection device. The path selection device can then perform path selection in accordance with the policy by routing network flows based on the mapping.

Figure 3A:
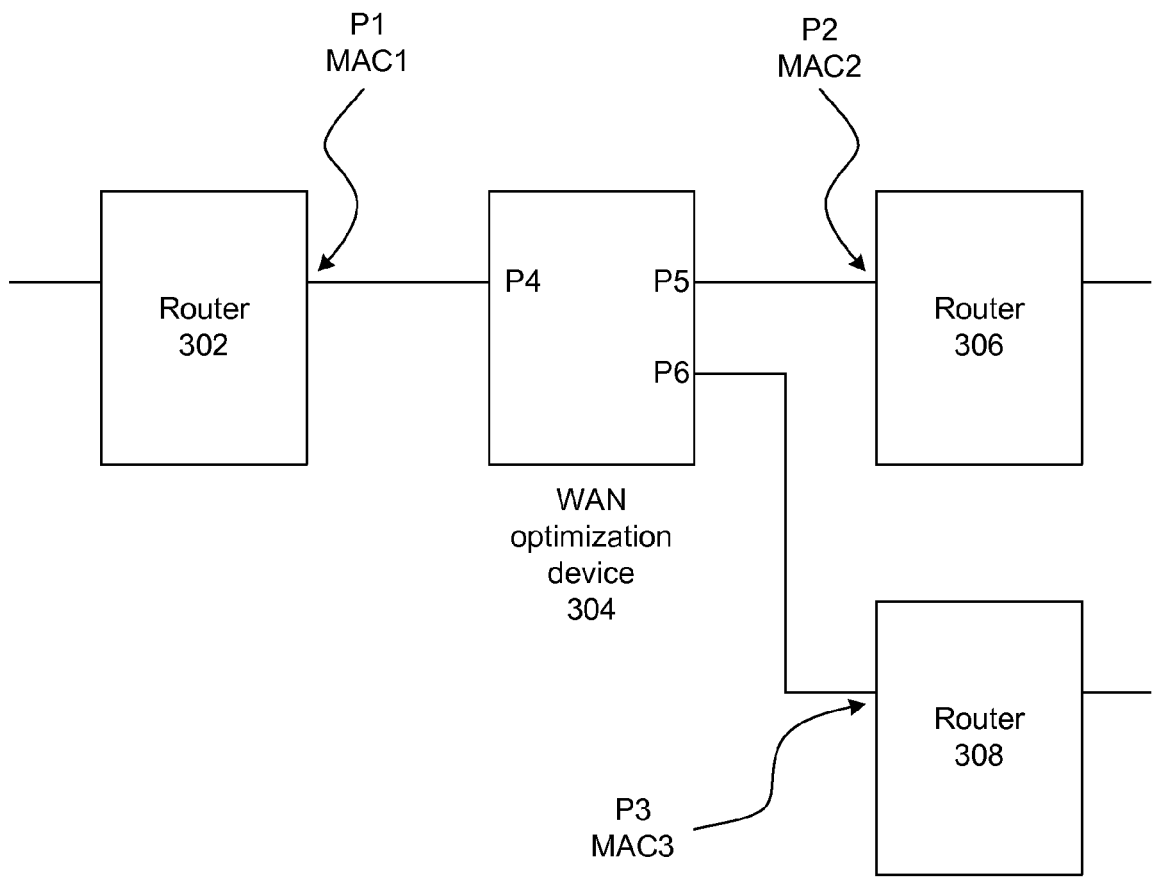
FIG. 3A illustrates an example of path selection in accordance with some embodiments described herein.

FIG. 3A illustrates an example of path selection in accordance with some embodiments described herein. The example shown in FIG. 3A can correspond to the network configuration shown in FIG. 1A. Specifically, router 302, WAN optimization device 304, router 306, and router 308 in FIG. 3A can correspond to router 106, WAN optimization device 108, router 110, and router 112, respectively, in FIG. 1A.

In FIG. 3A, port P1 (having link layer address MAC1) is connected to port P4 of WAN optimization device 304. Ports P5 and P6 of WAN optimization device 304 are connected to port P2 (having link layer address MAC2) of router 306 and port P3 (having link layer address MAG3) of router 308, respectively. WAN optimization device 304 is transparent to routers 302, 306, and 308 at the link layer. In other words, when router 302 sends a link layer packet (e.g., an Ethernet packet) to router 306, router 302 does not know that WAN optimization device 304 is between router 302 and router 306. Therefore, when router 302 sends a link layer packet to router 306, router 302 sets the destination link layer address in the link layer packet to MAC2.

Figure 3B:
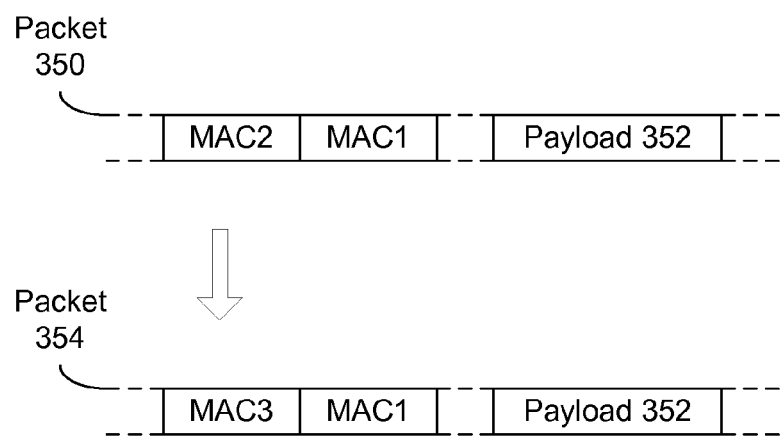
FIG. 3B illustrates a packet in accordance with some embodiments described herein.

FIG. 3B illustrates a packet in accordance with some embodiments described herein. Packet 350 can include a number of fields. Specifically, packet 350 can include link layer destination address MAC2, link layer source address MAC1, and payload data 352. The payload in a packet is the data that is desired to be communicated to the final destination of the packet (note that router 306 may not be the final destination of packet 350). For example, payload 352 may include a portion of an email or a document. WAN optimization device can transparently intercept packet 350, analyze the data in packet 350 (i.e., any part of packet 350—header and/or payload), and determine whether or not packet 350 needs to be sent along a different path.

In some embodiments, WAN optimization device 304 can analyze payload 352 to determine whether or not packet 350 needs to be sent along a different path. Specifically, WAN optimization device 304 can generate a fingerprint based on payload 352, and match the fingerprint against a database of known fingerprints to identify an application that generated the packet. Next, WAN optimization device 304 can use a policy (which can be a user-defined policy) to determine whether or not packets that originate from the identified application are to be forwarded (or routed) along a path that is different from the path that the packet would normally have been forwarded (or routed) based on the forwarding (or routing) tables in the network.

In any case, if WAN optimization device 304 determines that the packet does not require special handling, then the packet can be sent to router 306 without changing the destination link-layer address. On the other hand, if WAN optimization device 304 determines that the packet needs special handling, then WAN optimization device 304 can modify one or more bits in the header of the packet, and send the packet through an appropriate output port of WAN optimization device 304. For example, if WAN optimization device 304 determines that packet 350 is to be sent to router 308 instead of router 306, then WAN optimization device 304 can replace the link-layer destination address MAC2 (which corresponds to router 306) in packet 350 with the link-layer destination address MAG3 (which corresponds to router 308). WAN optimization device 304 can then send the packet with the replaced link-layer destination address (shown as packet 354 in FIG. 3B) to router 308 via port P6.

Figure 3C:
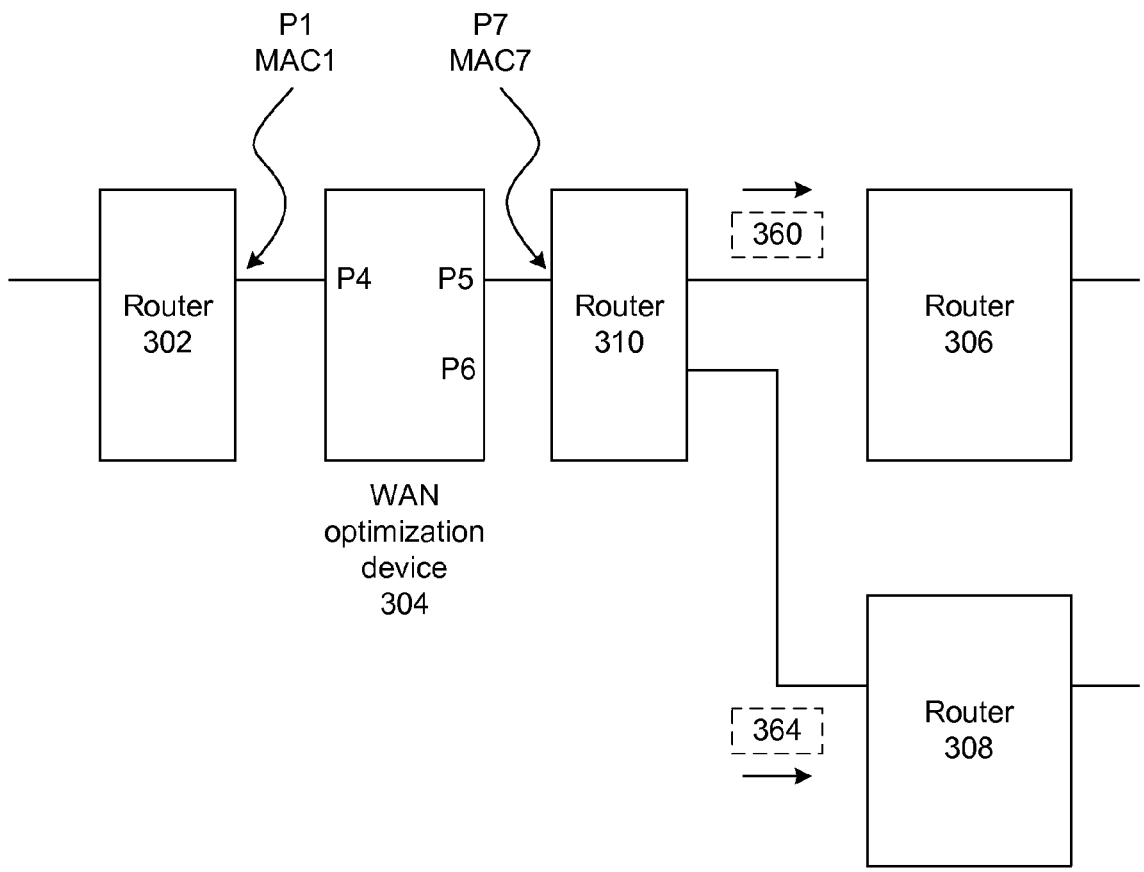
FIG. 3C illustrates an example of path selection in accordance with some embodiments described herein.

FIG. 3C illustrates an example of path selection in accordance with some embodiments described herein. The example shown in FIG. 3C can correspond to the network configuration shown in FIG. 1B. Specifically, router 302, WAN optimization device 304, router 310, router 306, and router 308 in FIG. 3C can correspond to router 106, WAN optimization device 108, router 136, router 110, and router 112, respectively, in FIG. 1B.

In FIG. 3C, port P1 (having link layer address MAC1) is connected to port P4 of WAN optimization device 304. Port P5 of WAN optimization device 304 is connected to port P7 (having link layer address MAC7) of router 310. WAN optimization device 304 is transparent to routers 302 and 310 at the link layer. In other words, when router 302 sends a link layer packet (e.g., an Ethernet packet) to router 310, router 302 does not know that WAN optimization device 304 is between router 302 and router 310. Therefore, when router 302 sends a link layer packet to router 310, router 302 sets the destination link layer address in the link layer packet to MAC7.

Figure 3D:
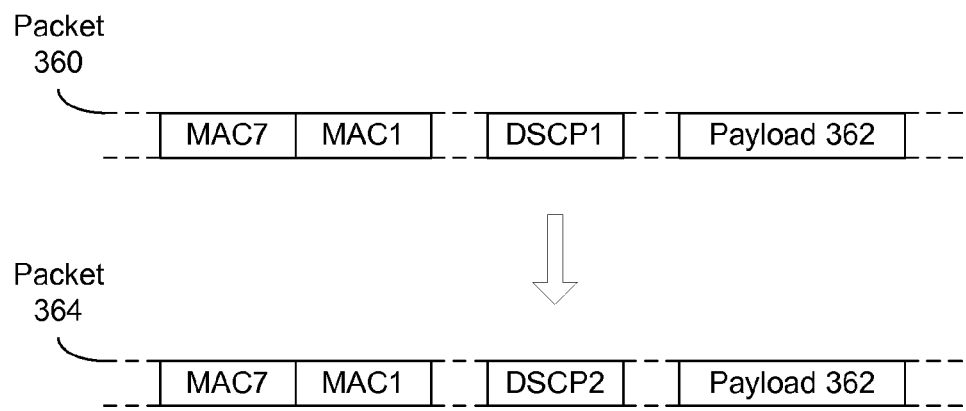
FIG. 3D illustrates a packet in accordance with some embodiments described herein.

FIG. 3D illustrates a packet in accordance with some embodiments described herein. As before, packet 360 can include a number of fields. Specifically, packet 360 can include link layer destination address MAC7, link layer source address MAC1, and payload data 362. WAN optimization device can transparently intercept packet 360, analyze the data in packet 360 (i.e., any part of packet 360—header and/or payload), and determine whether or not packet 360 needs to be sent along a different path.

In any case, if WAN optimization device 304 determines that the packet does not require special handling, then the packet can be sent to router 310 without changing any network layer header fields in the header. On the other hand, if WAN optimization device 304 determines that the packet needs special handling, then WAN optimization device 304 can modify one or more bits in an header (e.g., network layer header) of packet 360, and send the packet to router 310. For example, if WAN optimization device 304 determines that packet 360 is to be sent to router 308 instead of router 306, then WAN optimization device 304 can modify one or more bits in packet 360 (shown in FIG. 3D as modifying DSCP1 to DSCP2). WAN optimization device 304 can then send the packet with the modified header bits (shown as packet 364 in FIG. 3D) to router 310 via port P5. The modified header bits in the packet can then cause router 310 to forward (or route) the packet to router 308 instead forwarding (or routing) the packet to router 306. Specifically, in some embodiments, WAN optimization device 304 can modify the differentiated services code point (DSCP) bits (which are part of the DS field) in the IP header, and router 310 can be configured to use the DSCP bits while routing packets.

Figure 4:
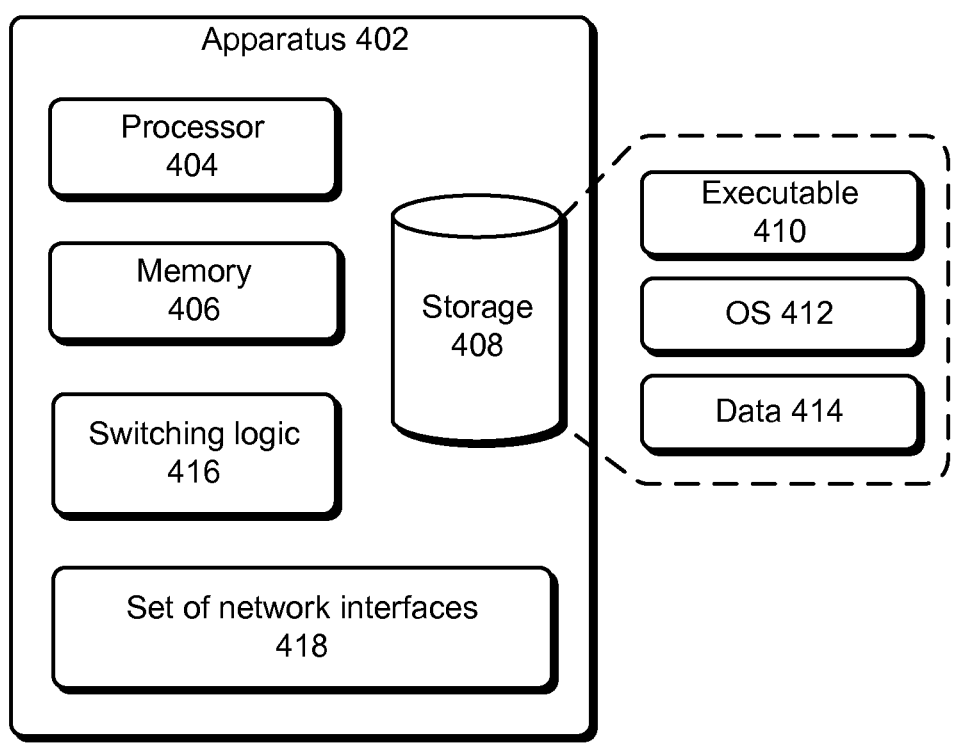
FIG. 4 illustrates an apparatus in accordance with some embodiments described herein.

FIG. 4 illustrates an apparatus in accordance with some embodiments described herein. Apparatus 402 comprises processor 404, memory 406 (e.g., a volatile or non-volatile random access memory), and storage 408 (e.g., a flash memory device or a disk drive). Storage 408 can store executable 410, operating system 412, and data 414. Apparatus 402 also includes switching logic 416 and set of network interfaces 418. The components in apparatus 402 can communicate with one another using a communication mechanism, e.g., a bus, a backplane, and/or a switching fabric.

Executable 410 can include instructions that, when executed by processor 404, cause apparatus 402 to perform one or more methods that are implicitly or explicitly described in this disclosure. Data 414 can include any data that is inputted into or outputted by executable 410. Set of network interfaces 418 can be used to transmit data to and/or receive data from other communication devices. Switching logic 416 can forward network traffic received on one or more network interfaces in accordance with switching/forwarding/routing information stored in apparatus 402.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for path selection, the method comprising:
creating a path selection table based on a path selection policy that associates at least two different applications with two different paths in the network, wherein said creating comprises (1) analyzing a first packet to determine a fingerprint associated with the first packet, (2) identifying an application associated with the fingerprint, (3) selecting a first path associated with the application based on the path selection policy, (4) determining a first network flow associated with the first packet, and (5) storing an association between the first network flow and the first selected path in the path selection table;
transparently intercepting a second packet at an intermediary device that is located between a source device and a first destination device, wherein a header of the second packet includes a link layer source address associated with the source device and a first link layer destination address associated with the first destination device;
determining a second network flow associated with the second packet;
determining a second path associated with the second network flow based on the path selection table;
replacing the first link layer destination address with a second link layer destination address associated with a second destination device that corresponds to the second path; and
forwarding the second packet to the second destination device.

2. A non-transitory computer-readable storage medium storing instructions that, when executed by a computer, cause the computer to perform a method for path selection, the method comprising:
creating a path selection table based on a path selection policy that associates at least two different applications with two different paths in the network, wherein said creating comprises (1) analyzing a first packet to determine a fingerprint associated with the first packet, (2) identifying an application associated with the fingerprint, (3) selecting a first path associated with the application based on the path selection policy, (4) determining a first network flow associated with the first packet, and (5) storing an association between the first network flow and the first selected path in the path selection table;
transparently intercepting a second packet at an intermediary device that is located between a source device and a first destination device, wherein a header of the second packet includes a link layer source address associated with the source device and a first link layer destination address associated with the first destination device;
determining a second network flow associated with the second packet;
determining a second path associated with the second network flow based on the path selection table;
replacing the first link layer destination address with a second link layer destination address associated with a second destination device that corresponds to the second path; and
forwarding the second packet to the second destination device.

3. A method for path selection, the method comprising:
creating a path selection table based on a path selection policy that associates at least two different applications with two different paths in the network, wherein said creating comprises (1) analyzing a first packet to determine a fingerprint associated with the first packet, (2) identifying an application associated with the fingerprint, (3) selecting a first path associated with the application based on the path selection policy, (4) determining a first network flow associated with the first packet, and (5) storing an association between the first network flow and the first selected path in the path selection table;
transparently intercepting a second packet at an intermediary device that is located between a source device and a destination device, wherein a link layer header of the second packet includes a link layer source address associated with the source device and a link layer destination address associated with the destination device, and wherein a routing table on the destination device is configured to forward the packet along a first path based at least on a network layer destination address in a network layer header of the packet;
determining a second network flow associated with the second packet;
determining a second path associated with the second network flow based on the path selection table;
modifying one or more bits in the network layer header of the second packet based on the second path; and
forwarding the second packet to the destination device, thereby causing the destination device to forward the packet along the second path instead of the first path.

* * * * *